(12) United States Patent
Lin

(10) Patent No.: US 10,276,239 B2
(45) Date of Patent: Apr. 30, 2019

(54) MEMORY CELL AND ASSOCIATED ARRAY STRUCTURE

(71) Applicant: eMemory Technology Inc., Hsin-Chu (TW)

(72) Inventor: Chun-Hung Lin, Hsinchu (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 26 days.

(21) Appl. No.: 15/643,525

(22) Filed: Jul. 7, 2017

(65) Prior Publication Data

US 2018/0315477 A1     Nov. 1, 2018

Related U.S. Application Data

(60) Provisional application No. 62/490,612, filed on Apr. 27, 2017.

(51) Int. Cl.

| | | |
|---|---|---|
| *G11C 11/00* | (2006.01) | |
| *G11C 14/00* | (2006.01) | |
| *G11C 17/16* | (2006.01) | |
| *G11C 11/419* | (2006.01) | |
| *G11C 17/18* | (2006.01) | |
| *G06F 21/73* | (2013.01) | |

(Continued)

(52) U.S. Cl.
CPC .......... *G11C 14/0054* (2013.01); *G06F 21/73* (2013.01); *G11C 7/062* (2013.01); *G11C 7/12* (2013.01); *G11C 7/24* (2013.01); *G11C 11/419* (2013.01); *G11C 17/16* (2013.01); *G11C 17/18* (2013.01)

(58) Field of Classification Search
CPC . G11C 17/16; G11C 17/18; G11C 2029/4402; G11C 11/408; G11C 29/027; G11C 29/789; G11C 5/14; G11C 16/14; G11C 7/065; G11C 7/12; G11C 8/12
See application file for complete search history.

(56) References Cited

U.S. PATENT DOCUMENTS

| | | | | |
|---|---|---|---|---|
| 5,519,654 A | * | 5/1996 | Kato | ....... G11C 16/10 327/532 |
| 5,677,884 A | * | 10/1997 | Zagar | ....... G11C 29/785 365/200 |

(Continued)

OTHER PUBLICATIONS

European Patent Office, "European search report", dated Jan. 31, 2018.

*Primary Examiner* — Hien N Nguyen
(74) *Attorney, Agent, or Firm* — WPAT, PC

(57) ABSTRACT

A memory cell includes a latch, two antifuse elements, and two select transistors. The latch is connected with a first node and a second node, and receives a first power voltage and a second power voltage. The latch is selectively enabled or disabled according to an enable line voltage. The first antifuse element is connected with the first node and an antifuse control line. The second antifuse element is connected with the second node and the antifuse control line. The gate terminal, the first drain/source terminal and the second drain/source terminal of the first select transistor are connected with a word line, the first node and a bit line, respectively. The gate terminal, the first drain/source terminal and the second drain/source terminal of the second select transistor are connected with the word line, the second node and an inverted bit line, respectively.

18 Claims, 7 Drawing Sheets

(51) Int. Cl.
*G11C 7/06* (2006.01)
*G11C 7/12* (2006.01)
*G11C 7/24* (2006.01)

(56) References Cited

U.S. PATENT DOCUMENTS

| | | | | |
|---|---|---|---|---|
| 5,818,781 | A | * | 10/1998 | Estakhri ............ G01R 19/16538 |
| | | | | 365/226 |
| 5,870,327 | A | | 2/1999 | Gitlin et al. |
| 6,704,236 | B2 | | 3/2004 | Buer et al. |
| 7,149,114 | B2 | | 12/2006 | Taheri et al. |
| 8,422,317 | B2 | * | 4/2013 | Kamp .................... G08B 13/06 |
| | | | | 365/189.16 |
| 8,611,138 | B1 | * | 12/2013 | Chu ....................... G11C 17/18 |
| | | | | 365/104 |
| 8,885,392 | B1 | | 11/2014 | Choe |
| 9,362,001 | B2 | * | 6/2016 | Wu ........................ G11C 16/14 |
| 9,613,714 | B1 | * | 4/2017 | Wong .................. G06F 12/1408 |
| 9,620,176 | B2 | * | 4/2017 | Wu ....................... H03K 17/161 |
| 9,741,446 | B2 | * | 8/2017 | Liao ....................... G11C 17/16 |
| 2014/0003124 | A1 | * | 1/2014 | Youn ..................... G11C 13/004 |
| | | | | 365/148 |

* cited by examiner

| | AF | WL | BL | BLB | EN |
|---|---|---|---|---|---|
| Program | V1 | Hi | Hi/Lo | Lo/Hi | Lo |
| Load | Hi | Lo | X | X | Hi |
| Read after load | floating | Hi | Lo/Hi | Hi/Lo | Hi |
| Write | floating | Hi | Hi/Lo | Lo/Hi | Hi |
| Read after write | floating | Hi | Hi/Lo | Lo/Hi | Hi |

| | AF | WL | BL | BLB | EN |
|---|---|---|---|---|---|
| Program | V1 | Hi | Hi/Lo | Lo/Hi | Lo |
| Load | Hi | Lo | X | X | Hi |
| Read after load | Lo | Hi | Lo/Hi | Hi/Lo | Hi |
| Write | Lo | Hi | Hi/Lo | Lo/Hi | Hi |
| Read after write | Lo | Hi | Hi/Lo | Lo/Hi | Hi |

| | AF | ISO | WL | BL | BLB | EN |
|---|---|---|---|---|---|---|
| Program | V1 | V2 | Hi | Hi/Lo | Lo/Hi | Lo |
| Load | Hi | Hi | Lo | X | X | Hi |
| Read after load | Lo | Lo | Hi | Lo/Hi | Hi/Lo | Hi |
| Write | Lo | Lo | Hi | Hi/Lo | Lo/Hi | Hi |
| Read after write | Lo | Lo | Hi | Hi/Lo | Lo/Hi | Hi |

US 10,276,239 B2

MEMORY CELL AND ASSOCIATED ARRAY STRUCTURE

This application claims the benefit of U.S. provisional application Ser. No. 62/490,612, filed Apr. 27, 2017, the disclosure of which is incorporated by reference herein in its entirety.

FIELD OF THE INVENTION

The present invention relates to a memory cell and an associated array structure, and more particularly to a memory cell containing a non-volatile memory portion and a volatile memory portion and an associated array structure.

BACKGROUND OF THE INVENTION

As is well known, memories can be used to store data. Generally, memories are classified into non-volatile memories and volatile memories.

When the electric power provided to the volatile memory is interrupted, the data stored in the volatile memory is lost. For example, the volatile memory includes a dynamic random access memory (DRAM), a static random access memory (SRAM), or the like.

When the electric power provided to the non-volatile memory is interrupted, the stored data is continuously retained in the non-volatile memory. For example, the non-volatile memory includes a flash memory, a resistive random-access memory (RRAM), or the like.

Generally, the non-volatile memory has a slower accessing speed and needs a higher operating voltage, and the volatile memory has a faster accessing speed and needs a lower operating voltage.

SUMMARY OF THE INVENTION

The present invention provides a novel memory cell and associated array structure. The memory cell contains a non-volatile memory portion and a volatile memory portion. Consequently, the memory cell can be selectively used as a non-volatile memory cell or a volatile memory cell.

An embodiment of the present invention provides a memory cell. The memory cell includes a latch, a first antifuse element, a second antifuse element, a first select transistor and a second select transistor. The latch is connected with a first node and a second node, and receives a first power voltage and a second power voltage. The latch is connected with an enable line. Moreover, the latch is selectively enabled or disabled according to an enable line voltage from the enable line. The first antifuse transistor is connected with the first node and an antifuse control line. The second antifuse element is connected with the second node and the antifuse control line. A gate terminal of the first select transistor is connected with a word line. A first drain/source terminal of the first select transistor is connected with the first node. A second drain/source terminal of the first select transistor is connected with a bit line. A gate terminal of the second select transistor is connected with the word line. A first drain/source terminal of the second select transistor is connected with the second node. A second drain/source terminal of the second select transistor is connected with an inverted bit line.

Another embodiment of the present invention provides an array structure. The array structure includes plural memory cells in an array arrangement. Each memory cell includes a latch, a first antifuse element, a second antifuse element, a first select transistor and a second select transistor. The latch is connected with a first node and a second node, and receives a first power voltage and a second power voltage. The latch is connected with an enable line. Moreover, the latch is selectively enabled or disabled according to an enable line voltage from the enable line. The first antifuse element is connected with the first node and an antifuse control line. The second antifuse element is connected with the second node and the antifuse control line. A gate terminal of the first select transistor is connected with a word line. A first drain/source terminal of the first select transistor is connected with the first node. A second drain/source terminal of the first select transistor is connected with a bit line. A gate terminal of the second select transistor is connected with the word line. A first drain/source terminal of the second select transistor is connected with the second node. A second drain/source terminal of the second select transistor is connected with an inverted bit line.

An embodiment of the present invention provides an operating method of the array structure, comprising steps of: before a program action is started, pre-charging the bit line and the inverted bit line, inactivating the first antifuse element and the second antifuse element, turning off the first select transistor and the second select transistor, and disenabling the latch; during a first time period of the program action, temporarily turning on the first select transistor and the second select transistor for pre-charging the node a and the node b of the latch; during a second time period of the program action, providing a first voltage to the antifuse control line and turning on the first select transistor and the second select transistor; and after the second time period of the program action, programming the first antifuse element and the second antifuse to store complementary data when complementary level states are provided to the bit line and the inverted bit line.

An embodiment of the present invention provides an operating method of the array structure, comprising steps of: before a load action is started, changing the bit line and the inverted bit line to a first level state, inactivating the first antifuse element and the second antifuse element, turning off the first select transistor and the second select transistor, and not providing the first power voltage to the latch; during a first time period of the load action, temporarily turning on the first select transistor and the second select transistor for changing the node a and the node b of the latch to the first level state; during a second time period of the load action, providing a first voltage to the antifuse control line; and after the second time period of the load action, loading complementary data stored in the first antifuse element and the second antifuse element to the node a and the node b when the first power voltage is provided to the latch and the latch is enabled.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
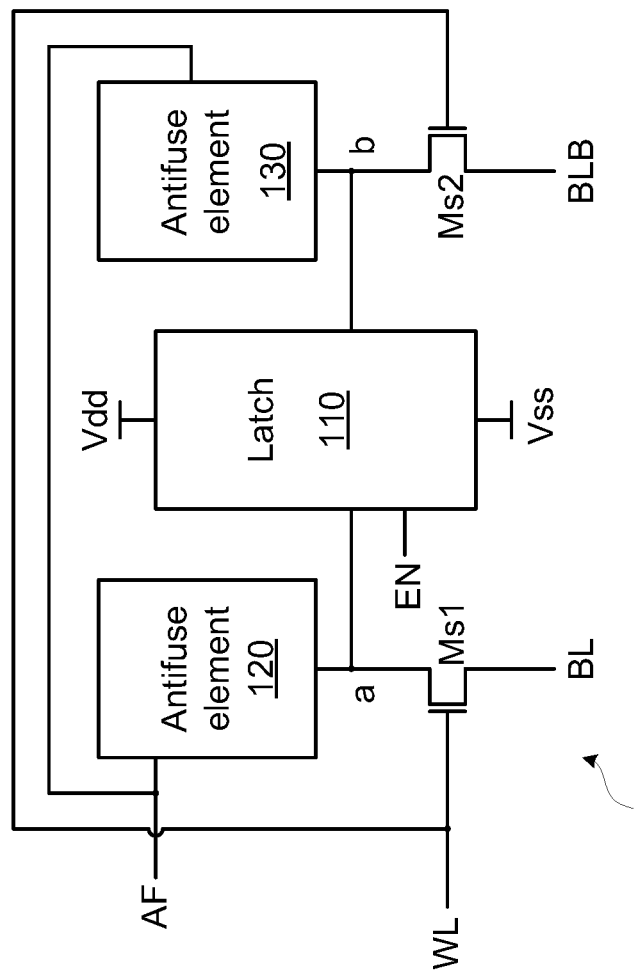
FIG. 1 illustrates the architecture of a memory cell according to an embodiment of the present invention.

FIG. 1 illustrates the architecture of a memory cell according to an embodiment of the present invention. As shown in FIG. 1, the memory cell 100 comprises a latch 110 and two antifuse elements 120, 130, and two select transistors Ms1, Ms2.

The two antifuse elements 120 and 130 are collaboratively defined as a differential antifuse element. That is, the two antifuse elements 120 and 130 can be programmed to store complementary data. For example, in case that the antifuse element 120 stores the data "1" (i.e. a low-resistance storage state), the antifuse element 130 stores the data "0" (i.e. a high-resistance storage state). Whereas, in case that the antifuse element 120 stores the data "0", the antifuse element 130 stores the data "1". The data "1" and the data "0" have different logic levels. It is noted that the definition of data "1" or "0" is for the purpose of illustration and not limitation.

The antifuse element 120 is connected with an antifuse control line AF and a node a. The antifuse element 130 is connected with the antifuse control line AF and a node b.

The latch 110 is connected with the node a and the node b. Moreover, the latch 110 receives power voltages Vdd and Vss. Moreover, the latch 110 is connected with an enable line EN. The latch 110 is selectively enabled or disabled according to the voltage of the enable line EN.

The gate terminal of the select transistor Ms1 is connected with a word line WL. The first drain/source terminal of the select transistor Ms1 is connected with the node a. The second drain/source terminal of the select transistor Ms1 is connected with a bit line BL. The gate terminal of the select transistor Ms2 is connected with a word line WL. The first drain/source terminal of the select transistor Ms2 is connected with the node b. The second drain/source terminal of the select transistor Ms2 is connected with an inverted bit line BLB.

In accordance with a feature of the present invention, the two antifuse elements 120, 130 and the two select transistors Ms1, Ms2 of the memory cell 100 are collaboratively defined as a non-volatile memory portion, and the latch 110 and the two select transistors Ms1, Ms2 of the memory cell 100 are collaboratively defined as a volatile memory portion.

Hereinafter, some examples of the memory cell and the operating principles will be described in more details.

Figures 2A, 2B:
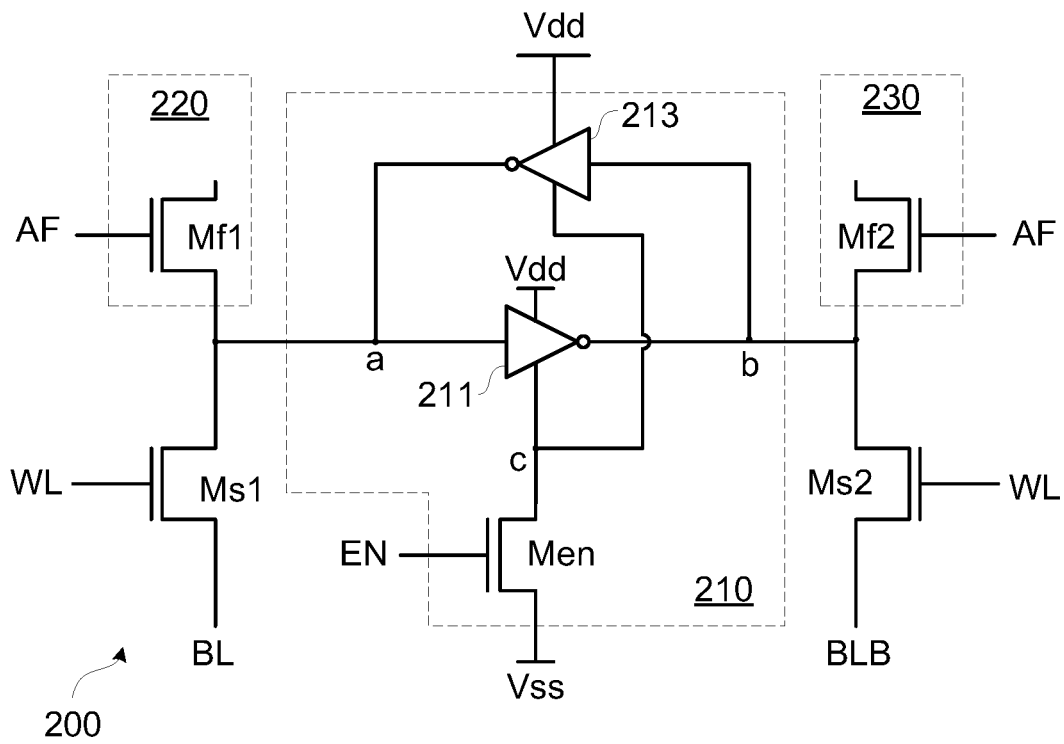
FIG. 2A is a schematic circuit diagram illustrating a memory cell according to a first embodiment of the present invention.
FIG. 2B illustrates associated voltage signals for performing various actions on the memory cell according to the first embodiment of the present invention.

FIG. 2A is a schematic circuit diagram illustrating a memory cell according to a first embodiment of the present invention. As shown in FIG. 2A, the memory cell 200 comprises a latch 210 and two antifuse elements 220, 230, and two select transistors Ms1, Ms2.

The latch 210 comprises two inverters 211, 213 and a transistor Men. The input terminal of the inverter 211 is connected with the node a. The output terminal of the inverter 211 is connected with the node b. The input terminal of the inverter 213 is connected with the node b. The output terminal of the inverter 213 is connected with the node a. The inverters 211 and 213 receive a power voltage Vdd. The gate terminal of the transistor Men is connected with the enable line EN. The first drain/source terminal of the transistor Men is connected with the node c. The second drain/source terminal of the transistor Men receives a power voltage Vss. The power voltage Vdd is higher than the power voltage Vss.

The power voltage Vss is selectively transmitted to the inverters 211 and 213 through the transistor Men according to an enable line voltage of the enable line EN. In case that the power voltage Vss is transmitted to the inverters 211 and 213, the latch 210 is enabled. In case that the power voltage Vss is not transmitted to the inverters 211 and 213, the latch 210 is disabled.

The antifuse element 220 comprises an antifuse transistor Mf1. The gate terminal of the antifuse transistor Mf1 is connected with the antifuse control line AF. The first drain/source terminal of the antifuse transistor Mf1 is connected with the node a. The antifuse element 230 comprises an antifuse transistor Mf2. The gate terminal of the antifuse transistor Mf2 is connected with the antifuse control line AF. The first drain/source terminal of the antifuse transistor Mf2 is connected with the node b. If the voltage difference between both terminals of the antifuse transistor Mf1 or Mf2 is too large, the gate oxide layer of the antifuse transistor Mf1 or Mf2 is ruptured.

FIG. 2B illustrates associated voltage signals for performing various actions on the memory cell according to the first embodiment of the present invention. In an embodiment, the power voltage Vdd is 1.2V (i.e., a high level state "Hi"), and the power voltage Vss is the ground voltage or 0V (i.e., a low level state "Lo"). It is noted that the magnitudes of the power voltages Vdd and Vss are not restricted. The bias voltages applied to the memory cell 200 for performing a program action, a load action, a read after load action, a write action and a read after write action are listed in the table of FIG. 2B.

During a program action, the antifuse elements 220 and 230 are programmed. The enable line voltage EN is in the low level state "Lo" to disable the latch 210. The word line voltage WL is in the high level state "Hi" to turn on the transistors Ms1 and Ms2. The antifuse line voltage AF is a first voltage V1. In an embodiment, the first voltage V1 is higher than the power voltage Vdd. For example, the first voltage V1 is 6.0V.

In case that the bit line voltage BL is in the low level state "Lo" and the inverted line voltage BLB is in the high level state "Hi", the antifuse element 220 is programmed to the data "1" and the antifuse element 230 is programmed to the data "0".

After the select transistors Ms1 and Ms2 are turned on, the storage states of the antifuse elements 220 and 230 are determined. Since the voltage difference between the gate terminal and the first drain/source terminal of the antifuse transistor Mf1 exceeds the withstand value, the gate oxide layer of the antifuse transistor Mf1 is ruptured. Since the voltage difference between the gate terminal and the first drain/source terminal of the antifuse transistor Mf2 does not exceed the withstand value, the gate oxide layer of the antifuse transistor Mf2 is not ruptured. Under this circumstance, the antifuse element 220 is programmed to be in a low-resistance storage state, and the antifuse element 230 is programmed to be in a high-resistance storage state. That means the antifuse element 220 stores the data "1", and the antifuse element 230 stores the data "0".

For preventing from damage of the latch 210 during the program action, the power voltage Vdd is properly adjusted. For example, the power voltage Vdd is adjusted to 1.8V.

During a load action, the stored data of the antifuse elements 220 and 230 are loaded into the latch 210. The enable line voltage EN is in the high level state "Hi" to enable the latch 210. The bit line voltage BL and the inverted line voltage BLB are not cared (X). The word line voltage WL is in the low level state "Lo" to turn off the transistors Ms1 and Ms2. The antifuse line voltage AF is in the high level state "Hi".

When the load action is performed, the antifuse element 220 generates a charging current to charge the node a and increase the voltage of the node a, but the antifuse element 230 is unable to generate the charging current to charge the node b. Consequently, the node a is maintained in the high level state "Hi" by the latch 210, and the node b is maintained in the low level state "Lo" by the latch 210.

After the load action, a read after load action can be performed to realize the data stored in the two antifuse elements 220 and 230. During the read after load action, the antifuse line voltage AF is in the floating state and the enable line voltage EN is in the high level state "Hi" to enable the latch 210.

When the word line voltage WL is in the high level state "Hi" to turn on the transistors Ms1 and Ms2, the high level state "Hi" maintained at the node a is transmitted to the bit line BL and the low level state "Lo" maintained at the node b is transmitted to the inverted bit line BLB. Consequently, data "1" stored in the antifuse elements 220 and data "0" stored in the antifuse element 230 are realized.

In another case of the program action, when the bit line voltage BL is in the high level state "Hi" and the inverted line voltage BLB is in the low level state "Lo", the antifuse element 220 is programmed to the data "0" (i.e. a high-resistance storage state) and the antifuse element 230 is programmed to the data "1" (i.e. a low-resistance storage state). Under this circumstance, the gate oxide layer of the antifuse transistor Mf2 is ruptured, and the gate oxide layer of the antifuse transistor Mf1 is not ruptured.

After the load action is performed, the node a is maintained in the low level state "Lo" by the latch 210, and the node b is maintained in the high level state "Hi" by the latch 210.

The same, a read after load action can be performed to realize the data stored in the two antifuse elements 220 and 230. During the read after load action, when the word line voltage WL is in the high level state "Hi" to turn on the transistors Ms1 and Ms2, the low level state "Lo" maintained at the node a is transmitted to the bit line BL and the high level state "Hi" maintained at the node b is transmitted to the inverted bit line BLB. Consequently, data "0" stored in the antifuse elements 220 and data "1" stored in the antifuse element 230 are realized.

From the above descriptions, for programming the antifuse element 220 to store data "1" and programming the antifuse element 230 to store data "0", the low level state "Lo" is provided to the bit line BL and the high level state "Hi" is provided to the inverted line BLB during the program action. And, when the load action and the read after load are performed, the bit line BL outputs the high level state "Hi" to indicate the data "1" stored in the antifuse element 220 and the inverted bit line BLB outputs the low level state "Lo" to indicate the data "0" stored in the antifuse element 230.

On the other hand, for programming the antifuse element 220 to store data "0" and programming the antifuse element 230 to store data "1", the high level state "Hi" is provided to the bit line BL and the low level state "Lo" is provided to the inverted line BLB during the program action. And, when the load action and the read after load are performed, the bit line BL outputs the low level state "Lo" to indicate the data "0" stored in the antifuse element 220 and the inverted bit line BLB outputs the high level state "Hi" to indicate the data "1" stored in the antifuse element 230.

During the write action, the write data is stored into the latch 210 through the bit line BL and the inverted bit line BLB. Meanwhile, the antifuse line voltage AF is in a floating state such that the write action will not be affected by the data stored in antifuse elements 220 and 230. Consequently, the antifuse elements 220 and 230 are inactivated. The enable line voltage EN is in the high level state "Hi" to enable the latch 210. The word line voltage WL is in the high level state "Hi" to turn on the transistors Ms1 and Ms2.

In case that the bit line voltage BL is in the high level state "Hi" and the inverted line voltage BLB is in the low level state "Lo", the high level "Hi" is stored into the node a of the latch 210 and the low level "Lo" is stored into the node b of the latch 210 when the word line voltage WL is in the high level state "Hi". Consequently, the node a is maintained in the high level state "Hi" by the latch 210, and the node b is maintained in the low level state "Lo" by the latch 210.

After the write action, a read after write action can be performed to realize the written data. During the read after write action, the antifuse line voltage AF is in the floating state and the enable line voltage EN is in the high level state "Hi" to enable the latch 210. And, when the word line voltage WL is in the high level state "Hi", the bit line BL outputs the high level state "Hi" and the inverted bit line BLB outputs the low level state "Lo".

In another case of the write action, when the bit line voltage BL is in the low level state "Lo" and the inverted line voltage BLB is in the high level state "Hi", the low level "Lo" is stored into the node a of the latch 210 and the high level "Hi" is stored into the node b of the latch 210. Consequently, the node a is maintained in the low level state "Lo" by the latch 210, and the node b is maintained in the high level state "Hi" by the latch 210.

The same, a read after write action can be performed to realize the written data. During the read after write action, when the word line voltage WL is in the high level state "Hi", the bit line BL outputs the low level state "Lo" and the inverted bit line BLB outputs the high level state "Hi".

From the above descriptions, for writing the high level state "Hi" into the node a and writing the low level state "Lo" into the node b of the latch 210, the high level state "Hi" is provided to the bit line BL and the low level state "Lo" is provided to the inverted line BLB during the write action. And, when the read after write is performed, the bit line BL outputs the high level state "Hi" and the inverted bit line BLB outputs the low level state "Lo" to indicate the written data stored in the latch 210.

On the other hand, for writing the low level state "Lo" into the node a and writing the high level state "Hi" into the node b of the latch 210, the low level state "Lo" is provided to the bit line BL and the high level state "Hi" is provided to the inverted line BLB during the write action. And, when the read after write is performed, the bit line BL outputs the low level state "Lo" and the inverted bit line BLB outputs the high level state "Hi" to indicate the written data stored in the latch 210.

From the above descriptions, the memory cell 200 can be used as a non-volatile memory cell or a volatile memory cell. When the memory cell 200 is used as the volatile memory cell, the antifuse elements 220 and 230 are inactivated. Meanwhile, the latch 210 and the select transistors Ms1 and Ms2 are collaboratively defined as a kind of static random access memory (SRAM) cells. Under this circumstance, the write action or the read after write action is selectively performed on the memory cell 200 according to the voltage levels of the word line WL, the bit line BL and the inverted bit line BLB.

When the memory cell 200 is used as the non-volatile memory cell, the stored data are programmed to the antifuse elements 220 and 230 during the program action. For outputting the stored data from the antifuse elements 220 and 230, the load action is firstly performed to load the stored data of the antifuse elements 220 and 230 into the latch 210. Then, the read after load action is performed and the stored data are outputted from the latch 210 to the bit line BL and the inverted bit line BLB.

Figures 3A, 3B:
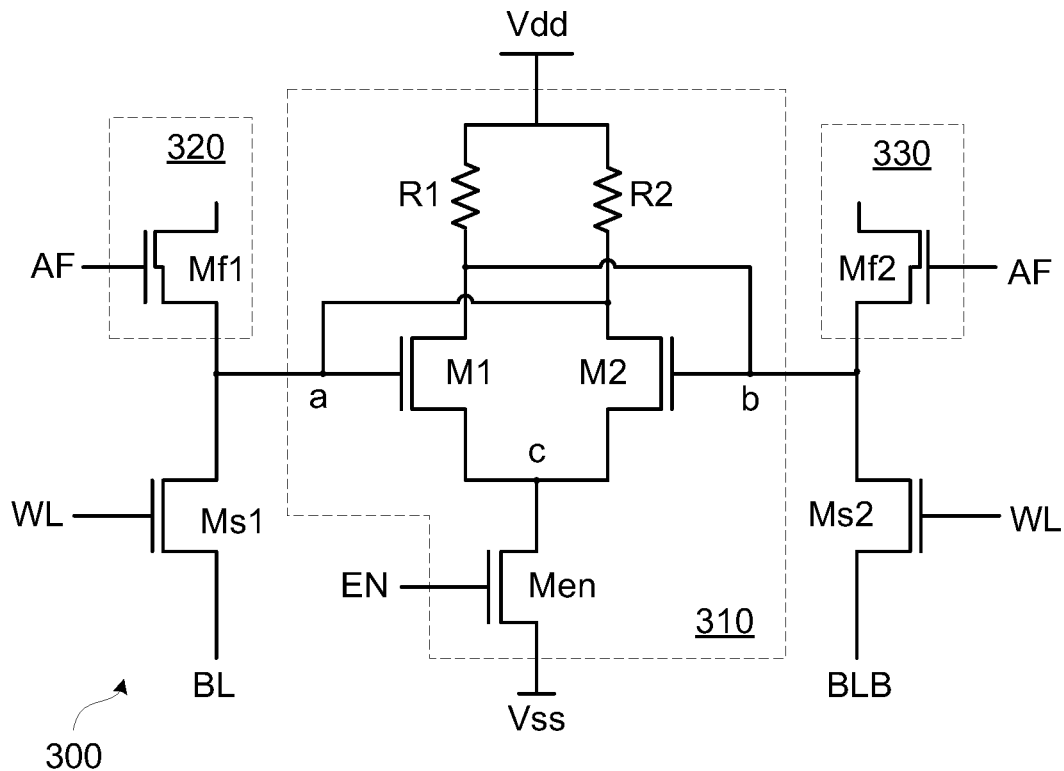
FIG. 3A is a schematic circuit diagram illustrating a memory cell according to a second embodiment of the present invention.
FIG. 3B illustrates associated voltage signals for performing various actions on the memory cell according to the second embodiment of the present invention.

FIG. 3A is a schematic circuit diagram illustrating a memory cell according to a second embodiment of the present invention. As shown in FIG. 3A, the memory cell 300 comprises a latch 310 and two antifuse elements 320, 330, and two select transistors Ms1, Ms2.

The latch 310 comprises two resistors R1, R2 and three transistors M1, M2, Men. In an embodiment, the transistors M1 and M2 are n-type transistors. A first terminal of the resistor R1 receives the power voltage Vdd. A second terminal of the resistor R1 is connected with the node b. A first terminal of the resistor R2 receives the power voltage Vdd. A second terminal of the resistor R2 is connected with the node a. The gate terminal of the transistor M1 is connected with the node a. The first drain/source terminal of the transistor M1 is connected with the node b. The second drain/source terminal of the transistor M1 is connected with the node c. The gate terminal of the transistor M2 is connected with the node b. The first drain/source terminal of the transistor M2 is connected with the node a. The second drain/source terminal of the transistor M2 is connected with the node c. The gate terminal of the transistor Men is connected with the enable line EN. The first drain/source terminal of the transistor Men is connected with the node c. The second drain/source terminal of the transistor Men receives a power voltage Vss. The transistor Men is selectively turned on or turned off according to an enable line voltage of the enable line EN. Consequently, the latch 310 is selectively enabled or disabled.

The antifuse element 320 comprises an antifuse transistor Mf1. The gate terminal of the antifuse transistor Mf1 is connected with the antifuse control line AF. The first drain/source terminal of the antifuse transistor Mf1 is connected with the node a. The antifuse element 230 comprises an antifuse transistor Mf2. The gate terminal of the antifuse transistor Mf2 is connected with the antifuse control line AF. The first drain/source terminal of the antifuse transistor Mf2 is connected with the node b. The gate oxide layer of the antifuse transistor Mf1 comprises a first part and a second part. The first part is closer to the first drain/source terminal, and the second part is closer to the second drain/source terminal. Moreover, the first part is thicker than the second part. The structure of the antifuse transistor Mf2 is similar to that of the antifuse transistor Mf1, and is not redundantly described herein. If the voltage difference between both terminals of the antifuse transistor Mf1 or Mf2 is too large, the second part of the gate oxide layer (i.e., the thinner part) of the antifuse transistor Mf1 or Mf2 is ruptured.

FIG. 3B illustrates associated voltage signals for performing various actions on the memory cell according to the second embodiment of the present invention. The bias voltages applied to the memory cell 300 for performing a program action, a load action, a read after load action, a write action and a read after write action are listed in the table of FIG. 3B.

During a program action, the antifuse elements 320 and 330 are programmed. The enable line voltage EN is in the low level state "Lo" to disable the latch 310. The word line voltage WL is in the high level state "Hi" to turn on the transistors Ms1 and Ms2. The antifuse line voltage AF is a first voltage V1. In an embodiment, the first voltage V1 is higher than the power voltage Vdd. For example, the first voltage V1 is 6.0V.

In case that the bit line voltage BL is in the low level state "Lo" and the inverted line voltage BLB is in the high level state "Hi", the antifuse element 320 is programmed to the stored data "1" and the antifuse element 330 is programmed to the stored data "0".

After the select transistors Ms1 and Ms2 are turned on, the storage states of the antifuse elements 320 and 330 are determined. Since the voltage difference between the gate terminal and the first drain/source terminal of the antifuse transistor Mf1 exceeds a withstand value, the second part of the gate oxide layer (i.e., the thinner part) of the antifuse transistor Mf1 is ruptured. Since the voltage difference between the gate terminal and the first drain/source terminal of the antifuse transistor Mf2 does not exceed the withstand value, the gate oxide layer of the antifuse transistor Mf2 is not ruptured. Under this circumstance, the antifuse element 320 is programmed to be in a low-resistance storage state, and the antifuse element 330 is programmed to be in a high-resistance storage state. That means the antifuse element 320 stores the data "1", and the antifuse element 330 stores the data "0".

For preventing from damage of the latch 310 during the program action, the power voltage Vdd is properly adjusted. For example, the power voltage Vdd is adjusted to 1.8V.

During a load action, the stored data of the antifuse elements 320 and 330 are loaded into the latch 310. The enable line voltage EN is in the high level state "Hi" to enable the latch 310. The bit line voltage BL and the inverted line voltage BLB are not cared (X). The word line voltage WL is in the low level state "Lo" to turn off the transistors Ms1 and Ms2. The antifuse line voltage AF is in the high level state "Hi".

When the load action is performed, the antifuse element 320 generates a charging current to charge the node a and increase the voltage of the node a, but the antifuse element 330 is unable to generate the charging current to charge the node b. Consequently, the node a is maintained in the high level state "Hi" by the latch 310, and the node b is maintained in the low level state "Lo" by the latch 310.

After the load action, a read after load action can be performed to realize the data stored in the two antifuse elements 320 and 330. During the read after load action, the antifuse line voltage AF is in the low level state "Lo" and the enable line voltage EN is in the high level state "Hi" to enable the latch 310.

When the word line voltage WL is in the high level state "Hi" to turn on the transistors Ms1 and Ms2, the high level state "Hi" maintained at the node a is transmitted to the bit line BL and the low level state "Lo" maintained at the node b is transmitted to the inverted bit line BLB. Consequently, data "1" stored in the antifuse elements 320 and data "0" stored in the antifuse element 330 are realized.

In another case of the program action, when the bit line voltage BL is in the high level state "Hi" and the inverted line voltage BLB is in the low level state "Lo", the antifuse element 320 is programmed to the data "0" (i.e. a high-resistance storage state) and the antifuse element 330 is programmed to the data "1" (i.e. a low-resistance storage state). Under this circumstance, the second part of the gate oxide layer of the antifuse transistor Mf2 is ruptured, and the gate oxide layer of the antifuse transistor Mf1 is not ruptured.

After the load action is performed, the node a is maintained in the low level state "Lo" by the latch 310, and the node b is maintained in the high level state "Hi" by the latch 310.

The same, a read after load action can be performed to realize the data stored in the two antifuse elements 320 and 330. During the read after load action, when the word line voltage WL is in the high level state "Hi" to turn on the transistors Ms1 and Ms2, the low level state "Lo" maintained at the node a is transmitted to the bit line BL and the high level state "Hi" maintained at the node b is transmitted to the inverted bit line BLB. Consequently, data "0" stored in the antifuse elements 320 and data "1" stored in the antifuse element 330 are realized.

From the above descriptions, for programming the antifuse element 320 to store data "1" and programming the antifuse element 330 to store data "0", the low level state "Lo" is provided to the bit line BL and the high level state "Hi" is provided to the inverted line BLB during the program action. And, when the load action and the read after load are performed, the bit line BL outputs the high level state "Hi" to indicate the data "1" stored in the antifuse element 320 and the inverted bit line BLB outputs the low level state "Lo" to indicate the data "0" stored in the antifuse element 330.

On the other hand, for programming the antifuse element 320 to store data "0" and programming the antifuse element 330 to store data "1", the high level state "Hi" is provided to the bit line BL and the low level state "Lo" is provided to the inverted line BLB during the program action. And, when the load action and the read after load are performed, the bit line BL outputs the low level state "Lo" to indicate the data "0" stored in the antifuse element 320 and the inverted bit line BLB outputs the high level state "Hi" to indicate the data "1" stored in the antifuse element 330.

During the write action, the write data is stored into the latch 310 through the bit line BL and the inverted bit line BLB. Meanwhile, the antifuse line voltage AF is in the low level state "Lo". Consequently, the antifuse elements 320 and 330 are inactivated. The enable line voltage EN is in the high level state "Hi" to enable the latch 310. The word line voltage WL is in the high level state "Hi" to turn on the transistors Ms1 and Ms2.

In case that the bit line voltage BL is in the high level state "Hi" and the inverted line voltage BLB is in the low level state "Lo", the high level "Hi" is stored into the node a of the latch 310 and the low level "Lo" is stored into the node b of the latch 310 when the word line voltage WL is in the high level state "Hi". Consequently, the node a is maintained in the high level state "Hi" by the latch 310, and the node b is maintained in the low level state "Lo" by the latch 310.

After the write action, a read after write action can be performed to realize the written data. During the read after write action, the antifuse line voltage AF is in the low level state "Lo" and the enable line voltage EN is in the high level state "Hi" to enable the latch 310. And, when the word line voltage WL is in the high level state "Hi", the bit line BL outputs the high level state "Hi" and the inverted bit line BLB outputs the low level state "Lo".

In another case of the write action, when the bit line voltage BL is in the low level state "Lo" and the inverted line voltage BLB is in the high level state "Hi", the low level "Lo" is stored into the node a of the latch 310 and the high level "Hi" is stored into the node b of the latch 310. Consequently, the node a is maintained in the low level state "Lo" by the latch 310, and the node b is maintained in the high level state "Hi" by the latch 310.

The same, a read after write action can be performed to realize the written data. During the read after write action, the antifuse line voltage AF is in the low level state "Lo" and the enable line voltage EN is in the high level state "Hi" to enable the latch 310. And, when the word line voltage WL is in the high level state "Hi", the bit line BL outputs the low level state "Lo" and the inverted bit line BLB outputs the high level state "Hi".

From the above descriptions, for writing the high level state "Hi" into the node a and writing the low level state "Lo" into the node b of the latch 310, the high level state "Hi" is provided to the bit line BL and the low level state "Lo" is provided to the inverted line BLB during the write action. And, when the read after write is performed, the bit line BL outputs the high level state "Hi" and the inverted bit line BLB outputs the low level state "Lo" to indicate the written data stored in the latch 310.

On the other hand, for writing the low level state "Lo" into the node a and writing the high level state "Hi" into the node b of the latch 310, the low level state "Lo" is provided to the bit line BL and the high level state "Hi" is provided to the inverted line BLB during the write action. And, when the read after write is performed, the bit line BL outputs the low level state "Lo" and the inverted bit line BLB outputs the high level state "Hi" to indicate the written data stored in the latch 310.

Similarly, the memory cell 300 can be used as a non-volatile memory cell or a volatile memory cell.

Figures 4A, 4B:
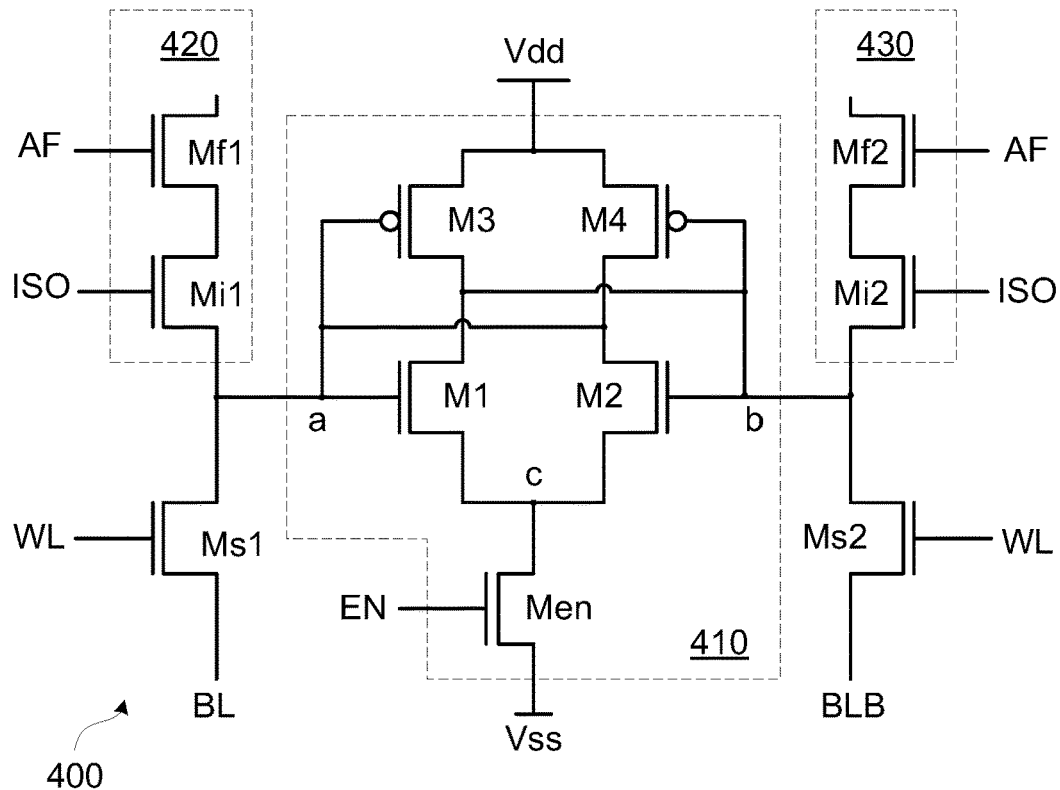
FIG. 4A is a schematic circuit diagram illustrating a memory cell according to a third embodiment of the present invention.
FIG. 4B illustrates associated voltage signals for performing various actions on the memory cell according to the third embodiment of the present invention.

FIG. 4A is a schematic circuit diagram illustrating a memory cell according to a third embodiment of the present invention. As shown in FIG. 4A, the memory cell 400 comprises a latch 410 and two antifuse elements 420, 430, and two select transistors Ms1, Ms2.

The latch 410 comprises transistors, M1, M2, M3, M4 and Men. In an embodiment, the transistors M1 and M2 are n-type transistors, and the transistors M3 and M4 are p-type transistors. The gate terminal of the transistor M1 is connected with the node a. The first drain/source terminal of the transistor M1 is connected with the node b. The second drain/source terminal of the transistor M1 is connected with the node c. The gate terminal of the transistor M2 is connected with the node b. The first drain/source terminal of the transistor M2 is connected with the node a. The second drain/source terminal of the transistor M2 is connected with the node c. The gate terminal of the transistor M3 is connected with the node a. The first drain/source terminal of the transistor M3 receives the power voltage Vdd. The second drain/source terminal of the transistor M3 is connected with the node b. The gate terminal of the transistor M4 is connected with the node b. The first drain/source terminal of the transistor M4 receives the power voltage Vdd. The second drain/source terminal of the transistor M4 is connected with the node a. The gate terminal of the transistor Men is connected with the enable line EN. The first drain/source terminal of the transistor Men is connected with the node c. The second drain/source terminal of the transistor Men receives a power voltage Vss. The transistor Men is selectively turned on or turned off according to an enable line voltage of the enable line EN. Consequently, the latch 410 is selectively enabled or disabled.

The antifuse element 420 comprises an antifuse transistor Mf1 and an isolation transistor Mi1. The gate terminal of the antifuse transistor Mf1 is connected with the antifuse control line AF. The gate terminal of the isolation transistor Mi1 is connected with an isolation control line ISO. The first drain/source terminal of the isolation transistor Mi1 is connected with the first drain/source terminal of the antifuse transistor Mf1. The second drain/source terminal of the isolation transistor Mi1 is connected with the node a. The antifuse element 430 comprises an antifuse transistor Mf2 and an isolation transistor Mi2. The gate terminal of the antifuse transistor Mf2 is connected with the antifuse control line AF. The gate terminal of the isolation transistor Mi2 is connected with the isolation control line ISO. The first drain/source terminal of the isolation transistor Mi2 is connected with the first drain/source terminal of the antifuse transistor Mf2. The second drain/source terminal of the isolation transistor Mi2 is connected with the node b.

FIG. 4B illustrates associated voltage signals for performing various actions on the memory cell according to the third embodiment of the present invention. The bias voltages applied to the memory cell 400 for performing a program action, a load action, a read after load action, a write action and a read after write action are listed in the table of FIG. 4B.

During a program action, the antifuse elements 420 and 430 are programmed. The enable line voltage EN is in the low level state "Lo" to disable the latch 410. The word line voltage WL is in the high level state "Hi" to turn on the transistors Ms1 and Ms2. The antifuse line voltage AF is a first voltage V1. The isolation line voltage ISO is a second voltage V2. In an embodiment, the first voltage V1 and the second voltage V2 are both higher than the power voltage Vdd. For example, the first voltage V1 is 6.0V, and the second voltage V2 is 2.2V.

In case that the bit line voltage BL is in the low level state "Lo" and the inverted line voltage BLB is in the high level state "Hi", the antifuse element 420 is programmed to the stored data "1" and the antifuse element 430 is programmed to the stored data "0".

After the select transistors Ms1, Ms2 and the isolation transistors Mi1, Mi2 are turned on, the storage states of the antifuse elements 420 and 430 are determined. Since the voltage difference between the gate terminal and the first drain/source terminal of the antifuse transistor Mf1 exceeds a withstand value, the gate oxide layer of the antifuse transistor Mf1 is ruptured. Since the voltage difference between the gate terminal and the first drain/source terminal of the antifuse transistor Mf2 does not exceed the withstand value, the gate oxide layer of the antifuse transistor Mf2 is not ruptured. Under this circumstance, the antifuse element 420 is programmed to be in a low-resistance storage state, and the antifuse element 430 is programmed to be in a high-resistance storage state. That means the antifuse element 420 stores the data "1", and the antifuse element 430 stores the data "0".

For preventing from damage of the latch 410 during the program action, the power voltage Vdd is properly adjusted. For example, the power voltage Vdd is adjusted to 1.8V.

During a load action, the stored data of the antifuse elements 420 and 430 are loaded into the latch 410. The enable line voltage EN is in the high level state "Hi" to enable the latch 410. The bit line voltage BL and the inverted line voltage BLB are not cared (X). The word line voltage WL is in the low level state "Lo" to turn off the transistors Ms1 and Ms2. The antifuse line voltage AF is in the high level state "Hi". The isolation line voltage ISO is also in the high level state "Hi".

When the load action is performed, the antifuse element 420 generates a charging current to charge the node a and increase the voltage of the node a, but the antifuse element 430 is unable to generate the charging current to charge the node b. Consequently, the node a is maintained in the high level state "Hi" by the latch 410, and the node b is maintained in the low level state "Lo" by the latch 410.

After the load action, a read after load action can be performed to realize the data stored in the two antifuse elements 420 and 430. During the read after load action, the antifuse line voltage AF and the isolation line voltage ISO are in the low level state "Lo" and the enable line voltage EN is in the high level state "Hi" to enable the latch 410.

When the word line voltage WL is in the high level state "Hi" to turn on the transistors Ms1 and Ms2, the high level state "Hi" maintained at the node a is transmitted to the bit line BL and the low level state "Lo" maintained at the node b is transmitted to the inverted bit line BLB. Consequently, data "1" stored in the antifuse elements 420 and data "0" stored in the antifuse element 430 are realized.

In another case of the program action, when the bit line voltage BL is in the high level state "Hi" and the inverted line voltage BLB is in the low level state "Lo", the antifuse element 420 is programmed to the data "0" (i.e. a high-resistance storage state) and the antifuse element 430 is programmed to the data "1" (i.e. a low-resistance storage state). Under this circumstance, the gate oxide layer of the antifuse transistor Mf2 is ruptured, and the gate oxide layer of the antifuse transistor Mf1 is not ruptured.

After the load action is performed, the node a is maintained in the low level state "Lo" by the latch 410, and the node b is maintained in the high level state "Hi" by the latch 410.

The same, a read after load action can be performed to realize the data stored in the two antifuse elements 420 and 430. During the read after load action, when the word line voltage WL is in the high level state "Hi" to turn on the transistors Ms1 and Ms2, the low level state "Lo" maintained at the node a is transmitted to the bit line BL and the high level state "Hi" maintained at the node b is transmitted to the inverted bit line BLB. Consequently, data "0" stored in the antifuse elements 420 and data "1" stored in the antifuse element 430 are realized.

From the above descriptions, for programming the antifuse element 420 to store data "1" and programming the antifuse element 430 to store data "0", the low level state "Lo" is provided to the bit line BL and the high level state "Hi" is provided to the inverted line BLB during the program action. And, when the load action and the read after load are performed, the bit line BL outputs the high level state "Hi" to indicate the data "1" stored in the antifuse element 420 and the inverted bit line BLB outputs the low level state "Lo" to indicate the data "0" stored in the antifuse element 430.

On the other hand, for programming the antifuse element 420 to store data "0" and programming the antifuse element 430 to store data "1", the high level state "Hi" is provided to the bit line BL and the low level state "Lo" is provided to the inverted line BLB during the program action. And, when the load action and the read after load are performed, the bit line BL outputs the low level state "Lo" to indicate the data "0" stored in the antifuse element 420 and the inverted bit line BLB outputs the high level state "Hi" to indicate the data "1" stored in the antifuse element 430.

During the write action, the write data is stored into the latch 410 through the bit line BL and the inverted bit line BLB. Meanwhile, the antifuse line voltage AF and the isolation line voltage ISO are in the low level state "Lo". Consequently, the antifuse elements 420 and 430 are inactivated. The enable line voltage EN is in the high level state "Hi" to enable the latch 410. The word line voltage WL is in the high level state "Hi" to turn on the transistors Ms1 and Ms2.

In case that the bit line voltage BL is in the high level state "Hi" and the inverted line voltage BLB is in the low level state "Lo", the high level "Hi" is stored into the node a of the latch 410 and the low level "Lo" is stored into the node b of the latch 410 when the word line voltage WL is in the high level state "Hi". Consequently, the node a is maintained in the high level state "Hi" by the latch 410, and the node b is maintained in the low level state "Lo" by the latch 410.

After the write action, a read after write action can be performed to realize the written data. During the read after write action, the antifuse line voltage AF and the isolation lone ISO are in the low level state "Lo" and the enable line voltage EN is in the high level state "Hi" to enable the latch 410. And, when the word line voltage WL is in the high level state "Hi", the bit line BL outputs the high level state "Hi" and the inverted bit line BLB outputs the low level state "Lo".

In another case of the write action, the bit line voltage BL is in the low level state "Lo" and the inverted line voltage BLB is in the high level state "Hi", the low level "Lo" is stored into the node a of the latch 410 and the high level "Hi" is stored into the node b of the latch 410. Consequently, the node a is maintained in the low level state "Lo" by the latch 410, and the node b is maintained in the high level state "Hi" by the latch 410.

The same, a read after write action can be performed to realize the written data. During the read after write action, the antifuse line voltage AF and the isolation lone ISO are in the low level state "Lo" and the enable line voltage EN is in the high level state "Hi" to enable the latch 410. And, when the word line voltage WL is in the high level state "Hi", the bit line BL outputs the low level state "Lo" and the inverted bit line BLB outputs the high level state "Hi".

From the above descriptions, for writing the high level state "Hi" into the node a and writing the low level state "Lo" into the node b of the latch 410, the high level state "Hi" is provided to the bit line BL and the low level state "Lo" is provided to the inverted line BLB during the write action. And, when the read after write is performed, the bit line BL outputs the high level state "Hi" and the inverted bit line BLB outputs the low level state "Lo" to indicate the written data stored in the latch 410.

On the other hand, for writing the low level state "Lo" into the node a and writing the high level state "Hi" into the node b of the latch 410, the low level state "Lo" is provided to the bit line BL and the high level state "Hi" is provided to the inverted line BLB during the write action. And, when the read after write is performed, the bit line BL outputs the low level state "Lo" and the inverted bit line BLB outputs the high level state "Hi" to indicate the written data stored in the latch 410.

Similarly, the memory cell 400 can be used as a nonvolatile memory cell or a volatile memory cell.

It is noted that the components of the memory cells 200, 300 and 400 may be combined to define various types of memory cells. For example, in another embodiment, the memory cell comprises the antifuse elements 420, 430 and the latch 210.

Figure 5:
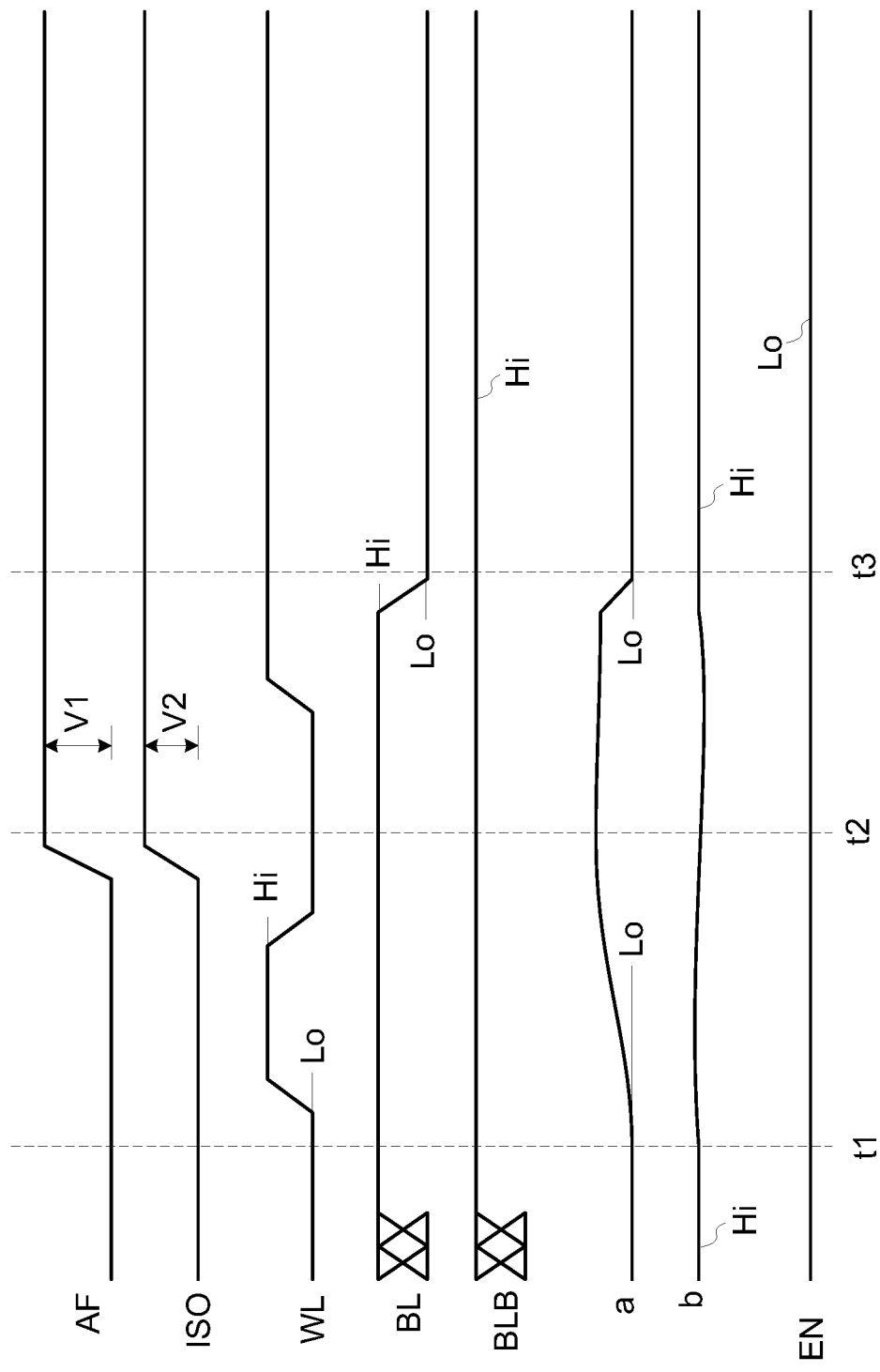
FIG. 5 is a schematic timing waveform diagram illustrating associated signals of the memory cell according to the third embodiment during the program action.

FIG. 5 is a schematic timing waveform diagram illustrating associated signals of the memory cell according to the third embodiment during the program action. Before the program action is started (i.e. before the time point t1), the bit line BL and the inverted bit line BLB are pre-charged to the high level state "Hi". The antifuse control line voltage AF and the isolation line voltage ISO are the low level state "Lo" for inactivating the first antifuse element 420 and the second antifuse element 430. The word line voltage WL is the low level state "Lo" for turning off the first select transistor Ms1 and the second select transistor Ms2. Furthermore, the enable line voltage EN is fixed in the low level state "Lo" for disabling the latch 410 during the program action.

At the time point t1, the latch 410 is disabled. In the time interval between t1 and t2, the word line voltage WL is shortly in the high level state "Hi" to temporarily turn on the transistors Ms1 and Ms2. Consequently, the bit line BL and the inverted bit line BLB in the high level state "Hi" pre-charge the node a and the node b. As shown in the drawing, the voltage of the node a is gradually increased from the low level "Lo", and the voltage of the node b is substantially maintained in the high level state "H. Alternatively, in another embodiment, the voltage of the node a is substantially maintained in the high level state "H, and the voltage of the node b is gradually increased from the low level "Lo".

In the time interval between t2 and t3, the antifuse line voltage AF reaches the first voltage V1, and the isolation line voltage ISO reaches the second voltage V2. Meanwhile, the bias voltages are applied to the antifuse transistors Mf1, Mf2 and the isolation transistors Mi1, Mi2. Moreover, the word line voltage WL is changed to the high level state "Hi" to turn on the transistors Ms1 and Ms2.

At the time point t3, the bit line voltage BL is changed to the low level state "Lo", and the inverted line voltage BLB is maintained in the high level state "Hi". Meanwhile, the gate oxide layer of the antifuse transistor Mf1 of the antifuse element 420 is ruptured, but the gate oxide layer of the antifuse transistor Mf2 of the antifuse element 430 is not ruptured. Consequently, the voltage of the node a is decreased to the low level "Lo", and the voltage of the node b is maintained in the high level state "H.

In another embodiment, the bit line voltage BL is maintained in the high level state "Hi", and the inverted line voltage BLB is changed to the low level state "Lo". Meanwhile, the gate oxide layer of the antifuse transistor Mf1 of the antifuse element 420 is not ruptured, but the gate oxide layer of the antifuse transistor Mf2 of the antifuse element 430 is ruptured.

Figure 6:
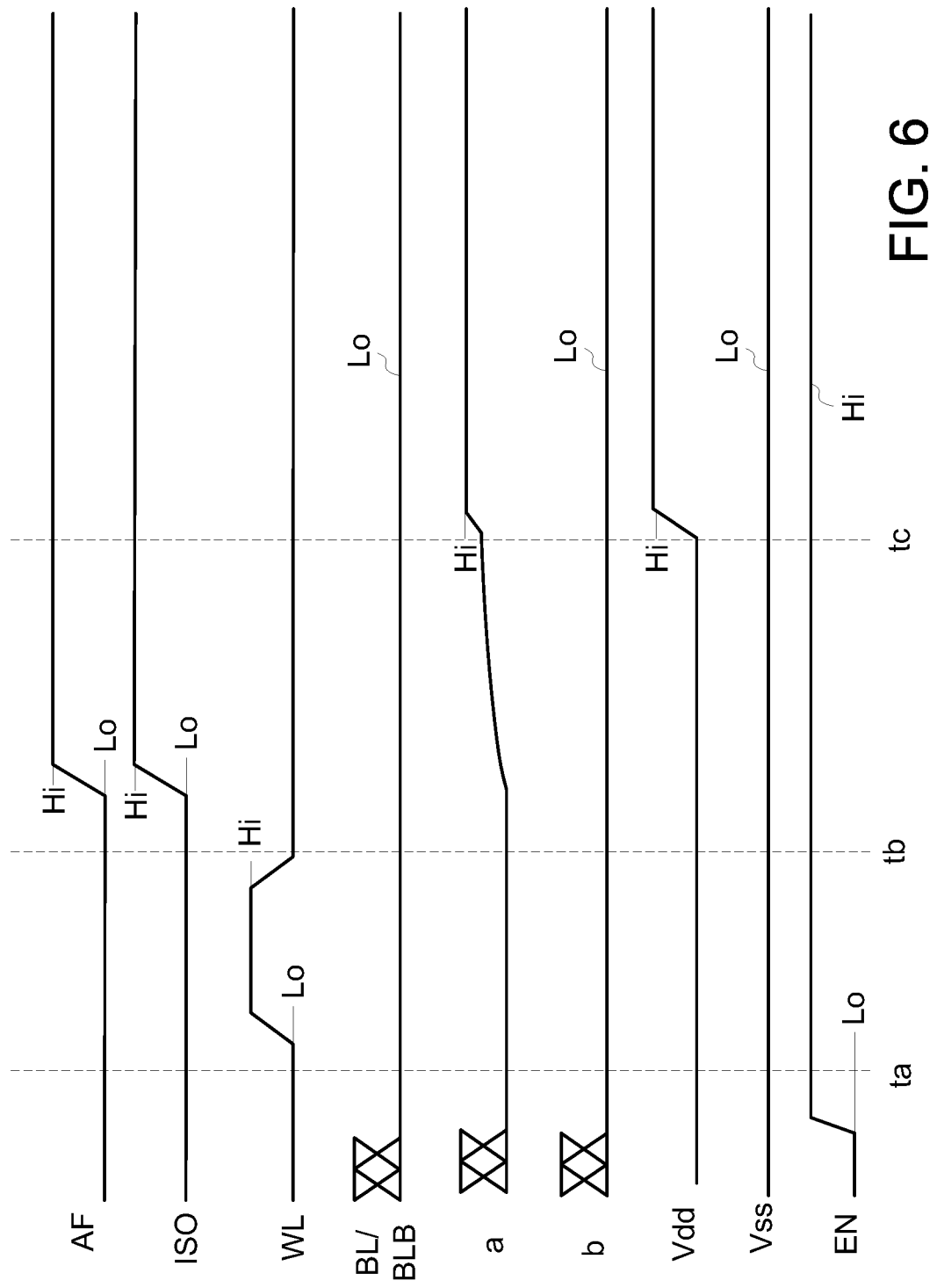
FIG. 6 is a schematic timing waveform diagram illustrating associated signals of the memory cell according to the third embodiment during the load action.

FIG. 6 is a schematic timing waveform diagram illustrating associated signals of the memory cell according to the third embodiment during the load action. Before the load action is started (i.e. before the time point ta), the bit line BL and the inverted bit line BLB are changed to the low level state "Lo", and the enable line voltage EN is changed to the high level state "Hi". The antifuse control line voltage AF and the isolation line voltage ISO are the low level state "Lo" for inactivating the first antifuse element 420 and the second antifuse element 430. The word line voltage WL is the low level state "Lo" for turning off the first select transistor Ms1 and the second select transistor Ms2. Moreover, the power voltages Vdd and Vss are both in the low level state "Lo". That means the power voltage is not provided to the latch 410.

In the time interval between ta and tb, the word line voltage WL is shortly in the high level state "Hi" to temporarily turn on the transistors Ms1 and Ms2. Consequently, the voltages of the node a and the node b are in the low level state "Lo".

In the time interval between tb and tc, the antifuse line voltage AF reaches the first voltage V1, and the isolation line voltage ISO reaches the second voltage V2. Meanwhile, the bias voltages are applied to the antifuse transistors Mf1, Mf2 and the isolation transistors Mi1, Mi2. Meanwhile, the antifuse element 420 generates a charging current to charge the node a and increase the voltage of the node a, but the antifuse element 430 is unable to generate the charging current to charge the node b. Consequently, the node b is maintained in the low level state "Lo". After the time point tc, the power voltage Vdd is changed to the high level state "Hi". The voltage of the node a is adjusted to the high level state "Hi" by the latch 410, and the node b is maintained in the low level state "Lo" by the latch 410. Meanwhile, the load action is completed.

In another embodiment, the antifuse element 420 does not generate the charging current but the antifuse element 430 generates the charging current in the time interval between tb and tc. After the time point tc, the node a is maintained in the low level state "Lo" by the latch 410, and the voltage of the node b is adjusted to the high level state "Hi" by the latch 410. Meanwhile, the load action is completed.

Figure 7:
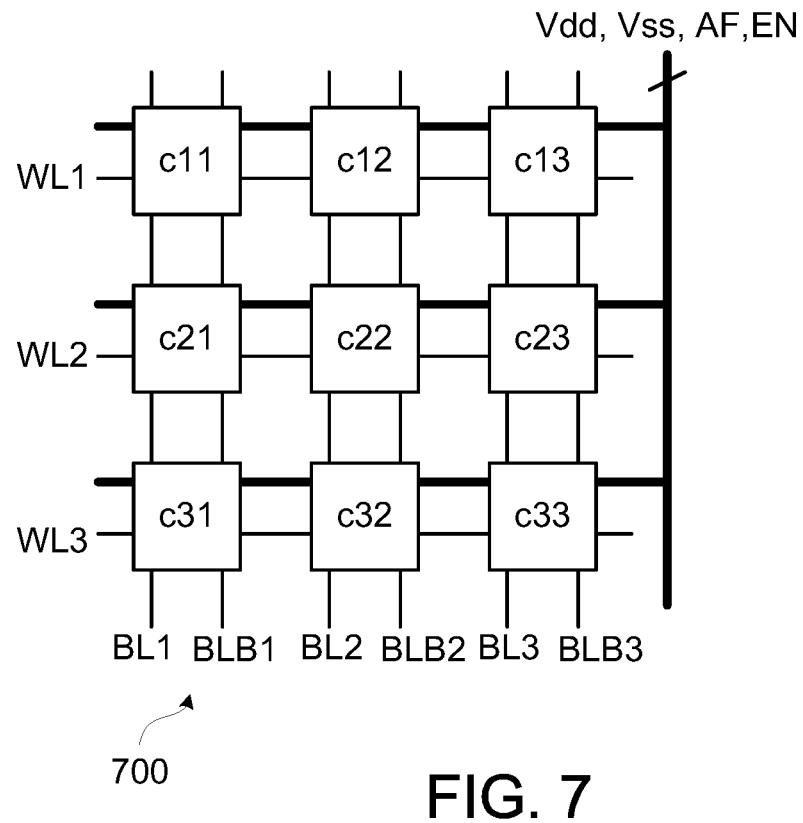
FIG. 7 illustrates an array structure of memory cells according to an embodiment of the present invention.

FIG. 7 illustrates an array structure of memory cells according to an embodiment of the present invention. The array structure 700 comprises plural memory cells. For succinctness, only nine memory cells c11~c33 in a 3×3 array are shown in the drawing. The array structure may be formed as a sector of a memory device. Moreover, the memory cells c11~c33 may have the configurations of the above embodiments.

The memory cells in the same row are connected with the same word line. The memory cells in the same column are connected with the same bit line pair. For example, the memory cells c11~c13 in the first row are connected with the word line WL1, and memory cells c11~c31 in the first column are connected with the bit line BL1 and the inverted bit line BLB1.

All of the memory cells c11~c33 are connected with the power voltages Vdd and Vss. The antifuse control lines AF for all memory cells c11~c33 are connected with each other. The enable lines EN for all memory cells c11~c33 are connected with each other. In case that these memory cells contain isolation control lines ISO, these isolation control lines ISO are connected with each other.

It is noted that the size of the array structure is not restricted. That is, the size of the array structure may be varied according to the practical requirements. In some other embodiments, the antifuse control lines AF for all memory cells are not completely connected with each other, and the enable lines EN for all memory cells are not completely connected with each other. For example, in another embodiment, the antifuse control lines AF for the memory cells in the same row are connected with each other, and the enable lines EN for the memory cells in the same row are connected with each other.

The array structure 700 shown in FIG. 7 may be merged into the SRAM array structure of the conventional SRAM memory module so as to extend the total size of the SRAM memory module.

Figure 8:
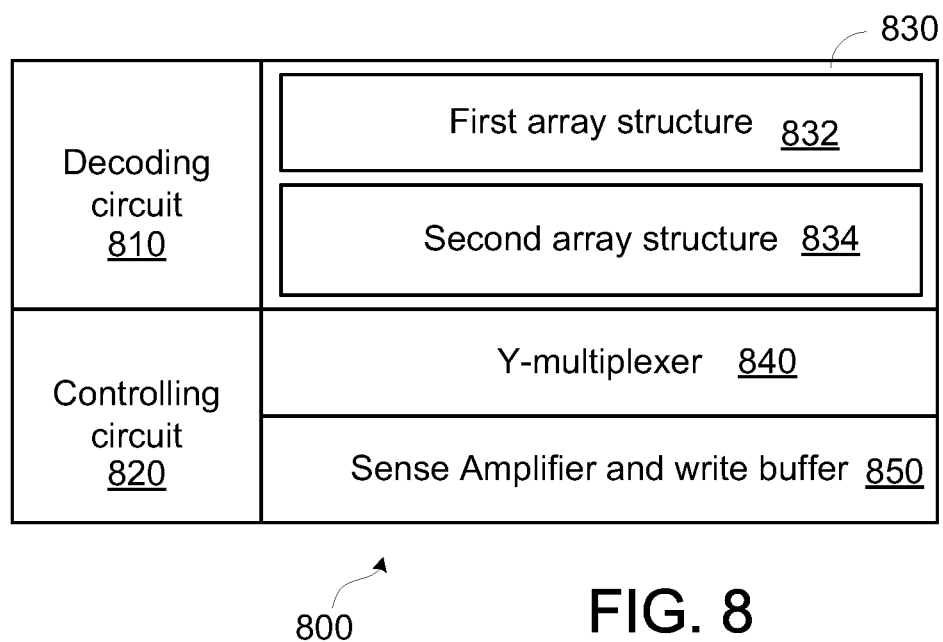
FIG. 8 illustrates a memory module of the present invention.

FIG. 8 illustrates a memory module of the present invention. The memory module 800 comprises a decoding circuit 810, a controlling circuit 820, an array structure 830, a Y-multiplexer 840 and a sense amplifier and write buffer 850. The array structure 830 further comprises a first array structure 832 and a second array structure 834.

In the array structure 830, the second array structure 834 maybe constructed by SRAM cells and the first array structure 832 maybe constructed by volatile and non-volatile memory cells. Also, the array structure 700 shown in FIG. 7 can be use as the first array structure 832.

The decoding circuit 810, the controlling circuit 820, the second array structure 834, the Y-multiplexer 840 and the sense amplifier and write buffer 850 are collaboratively defined as the conventional SRAM memory module.

According to the present invention, the first array structure 832 is merged with the second array structure 834 to form the array structure 830 of the memory module 800. Also, by connecting the bit lines of the first array structure 832 to the bit lines of the conventional SRAM memory module and connecting the word lines of the first array structure 832 to the decoding circuit 810, the controlling circuit 820 can control the first array structure 832 to use the common Y-multiplexer 840 and the sense amplifier and write buffer 850 that are already developed in the SRAM memory module. In this way, the total memory size of the memory module 800 is enlarged.

From the above descriptions, the present invention provides a novel memory cell and associated array structure. The memory cell contains a non-volatile memory portion and a volatile memory portion. Consequently, the memory cell can be selectively used as a non-volatile memory cell or a volatile memory cell.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A memory cell, comprising:
   a latch connected with a first node and a second node, and receiving a first power voltage and a second power voltage, wherein the latch is connected with an enable line, and the latch is selectively enabled or disabled according to an enable line voltage from the enable line;

a first antifuse element connected with the first node and an antifuse control line;
a second antifuse element connected with the second node and the antifuse control line;
a first select transistor, wherein a gate terminal of the first select transistor is connected with a word line, a first drain/source terminal of the first select transistor is connected with the first node, and a second drain/source terminal of the first select transistor is connected with a bit line; and
a second select transistor, wherein a gate terminal of the second select transistor is connected with the word line, a first drain/source terminal of the second select transistor is connected with the second node, and a second drain/source terminal of the second select transistor is connected with an inverted bit line;
wherein the latch, the first select transistor and the second select transistor are collaboratively defined as a volatile memory portion of the memory cell, and the first antifuse element, the second antifuse element, the first select transistor and the second select transistor are collaboratively defined as a non-volatile memory portion of the memory cell; and
wherein after a program action of the memory cell is performed, the first antifuse element and the second antifuse element are programmed to store complementary data.

2. The memory cell as claimed in claim 1, wherein the latch comprises:
a first inverter receiving the first power voltage, wherein an input terminal of the first inverter is connected with the first node, and an output terminal of the first inverter is connected with the second node;
a second inverter receiving the first power voltage, wherein an input terminal of the second inverter is connected with the second node, and an output terminal of the second inverter is connected with the first node; and
an enable transistor, wherein a gate terminal of the enable transistor is connected with the enable line, a first drain/source terminal of the enable transistor is connected with a third node, and a second drain/source terminal of the enable transistor receives the second power voltage,
wherein the second power voltage is selectively transmitted to the first inverter or the second inverter through the enable transistor according to the enable line voltage.

3. The memory cell as claimed in claim 1, wherein the latch comprises:
a first resistor, wherein a first terminal of the first resistor receives the first power voltage, and a second terminal of the first resistor is connected with the second node;
a second resistor, wherein a first terminal of the second resistor receives the first power voltage, and a second terminal of the second resistor is connected with the first node;
a first n-type transistor, wherein a gate terminal of the first n-type transistor is connected with the first node, a first drain/source terminal of the first n-type transistor is connected with the second node, and a second drain/source terminal of the first n-type transistor is connected with a third node;
a second n-type transistor, wherein a gate terminal of the second n-type transistor is connected with the second node, a first drain/source terminal of the second n-type transistor is connected with the first node, and second drain/source terminal of the second n-type transistor is connected with the third node; and
an enable transistor, wherein a gate terminal of the enable transistor is connected with the enable line, a first drain/source terminal of the enable transistor is connected with the third node, and a second drain/source terminal of the enable transistor receives the second power voltage.

4. The memory cell as claimed in claim 1, wherein the latch comprises:
a first p-type transistor, wherein a gate terminal of the first p-type transistor is connected with the first node, a first drain/source terminal of the first p-type transistor receives the first power voltage, and a second drain/source terminal of the first p-type transistor is connected with the second node;
a second p-type transistor, wherein a gate terminal of the second p-type transistor is connected with the second node, a first drain/source terminal of the second p-type transistor receives the first power voltage, and a second drain/source terminal of the second p-type transistor is connected with the first node;
a first n-type transistor, wherein a gate terminal of the first n-type transistor is connected with the first node, a first drain/source terminal of the first n-type transistor is connected with the second node, and a second drain/source terminal of the first n-type transistor is connected with a third node;
a second n-type transistor, wherein a gate terminal of the second n-type transistor is connected with the second node, a first drain/source terminal of the second n-type transistor is connected with the first node, and second drain/source terminal of the second n-type transistor is connected with the third node; and
an enable transistor, wherein a gate terminal of the enable transistor is connected with the enable line, a first drain/source terminal of the enable transistor is connected with the third node, and a second drain/source terminal of the enable transistor receives the second power voltage.

5. The memory cell as claimed in claim 1, wherein the first antifuse element comprises an antifuse transistor, wherein a gate terminal of the antifuse transistor is connected with the antifuse control line, and a first drain/source terminal of the antifuse transistor is connected with the first node, wherein if a voltage difference between the gate terminal and the first drain/source terminal of the antifuse transistor exceeds a threshold value, a gate oxide layer of the antifuse transistor is ruptured.

6. The memory cell as claimed in claim 1, wherein the first antifuse element comprises an antifuse transistor, and a gate oxide layer of the antifuse transistor comprises a first part and a second part, wherein a gate terminal of the antifuse transistor is connected with the antifuse control line, a first drain/source terminal of the antifuse transistor is connected with the first node, and the second part is thicker than the first part, wherein if a voltage difference between the gate terminal and the first drain/source terminal of the antifuse transistor exceeds a withstand value, the second part of the gate oxide layer of the antifuse transistor is ruptured.

7. The memory cell as claimed in claim 1, wherein the first antifuse element comprises:
an antifuse transistor, wherein a gate terminal of the antifuse transistor is connected with the antifuse control line; and
an isolation transistor, wherein a gate terminal of the isolation transistor is connected with an isolation control line, a first drain/source terminal of the isolation transistor is connected with a first drain/source terminal of the antifuse transistor, and a second drain/source terminal of the isolation transistor is connected with the first node, wherein if a voltage difference between the gate terminal and the first drain/source terminal of the antifuse transistor exceeds a withstand value, a gate oxide layer of the antifuse transistor is ruptured.

8. The memory cell as claimed in claim 1, wherein after a load action of the memory cell is performed, the stored data of the first antifuse element and the second antifuse element are loaded to the latch.

9. The memory cell as claimed in claim 8, wherein after a write action of the memory cell is performed, the data from the bit line and the inverted bit line are stored into the latch.

10. The memory cell as claimed in claim 9, wherein after a read after load action or a read after write action of the memory cell is performed, the stored data of the latch are outputted to the bit line and the inverted bit line.

11. An operating method of the array structure as claimed in claim 1, the operating method comprising steps of:
before a program action is started, pre-charging the bit line and the inverted bit line, inactivating the first antifuse element and the second antifuse element, turning off the first select transistor and the second select transistor, and disenabling the latch;
during a first time period of the program action, temporarily turning on the first select transistor and the second select transistor for pre-charging the node a and the node b of the latch;
during a second time period of the program action, providing a first voltage to the antifuse control line and turning on the first select transistor and the second select transistor; and
after the second time period of the program action, programming the first antifuse element and the second antifuse to store complementary data when complementary level states are provided to the bit line and the inverted bit line.

12. The operating method as claimed in claim 11, further comprising steps of:
providing a second voltage to an isolation line of the first antifuse element and the second antifuse element during the second time period of the program action.

13. An operating method of the array structure as claimed in claim 1, the operating method comprising steps of:
before a load action is started, changing the bit line and the inverted bit line to a first level state, inactivating the first antifuse element and the second antifuse element, turning off the first select transistor and the second select transistor, and not providing the first power voltage to the latch;
during a first time period of the load action, temporarily turning on the first select transistor and the second select transistor for changing the node a and the node b of the latch to the first level state;
during a second time period of the load action, providing a first voltage to the antifuse control line; and
after the second time period of the load action, loading complementary data stored in the first antifuse element and the second antifuse element to the node a and the node b when the first power voltage is provided to the latch and the latch is enabled.

14. The operating method as claimed in claim 13, further comprising steps of:
providing a second voltage to an isolation line of the first antifuse element and the second antifuse element during the second time period of the load action.

15. An array structure comprising plural memory cells in an array arrangement, each of the plural memory cells comprising:
a latch connected with a first node and a second node, and receiving a first power voltage and a second power voltage, wherein the latch is connected with an enable line, and the latch is selectively enabled or disabled according to an enable line voltage from the enable line;
a first antifuse element connected with the first node and an antifuse control line;
a second antifuse element connected with the second node and the antifuse control line;
a first select transistor, wherein a gate terminal of the first select transistor is connected with a word line, a first drain/source terminal of the first select transistor is connected with the first node, and a second drain/source terminal of the first select transistor is connected with a bit line; and
a second select transistor, wherein a gate terminal of the second select transistor is connected with the word line, a first drain/source terminal of the second select transistor is connected with the second node, and a second drain/source terminal of the second select transistor is connected with an inverted bit line;
wherein the latch, the first select transistor and the second select transistor are collaboratively defined as a volatile memory portion of the memory cell, and the first antifuse element, the second antifuse element, the first select transistor and the second select transistor are collaboratively defined as a non-volatile memory portion of the memory cell; and
wherein after a program action of the memory cell is performed, the first antifuse element and the second antifuse element are programmed to store complementary data.

16. The array structure as claimed in claim 15, wherein the enable lines for the plural memory cells are connected with each other.

17. The array structure as claimed in claim 15, wherein the antifuse control lines for the plural memory cells are connected with each other.

18. The array structure as claimed in claim 15, wherein the first antifuse element and the second antifuse element of each memory cell are further connected with an isolation control line, wherein the isolation control lines for the plural memory cells are connected with each other.

* * * * *